United States Patent
Kikukawa et al.

(10) Patent No.: US 8,246,254 B2
(45) Date of Patent: Aug. 21, 2012

(54) BEARING STRUCTURE

(75) Inventors: Daisuke Kikukawa, Toyota (JP); Takashi Suzumura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 189 days.

(21) Appl. No.: 12/674,877

(22) PCT Filed: Sep. 29, 2008

(86) PCT No.: PCT/JP2008/068118
§ 371 (c)(1),
(2), (4) Date: Feb. 23, 2010

(87) PCT Pub. No.: WO2009/048029
PCT Pub. Date: Apr. 16, 2009

(65) Prior Publication Data
US 2011/0176760 A1   Jul. 21, 2011

(30) Foreign Application Priority Data
Oct. 12, 2007  (JP) ................................. 2007-266695

(51) Int. Cl.
*F16C 43/00* (2006.01)
(52) U.S. Cl. ........................................ 384/537; 384/517
(58) Field of Classification Search .................. 384/510, 384/513, 515, 537, 559, 564, 569, 584
See application file for complete search history.

(56) References Cited

U.S. PATENT DOCUMENTS

| | | | |
|---|---|---|---|
| 1,437,969 A * | 12/1922 | Fjellman | ........................ 384/510 |
| 3,397,021 A | 8/1968 | Fitzsimmons | |
| 4,422,227 A * | 12/1983 | Illg | ............................... 384/564 |
| 4,629,354 A | 12/1986 | Freese | |
| 5,547,291 A | 8/1996 | Miyazaki et al. | |
| 6,102,575 A | 8/2000 | Obara | |
| 7,731,613 B2 | 6/2010 | Ishida et al. | |
| 2001/0044350 A1 | 11/2001 | Nishigaya et al. | |
| 2003/0048965 A1 | 3/2003 | Miyazaki et al. | |
| 2007/0211975 A1 | 9/2007 | Bramstedt et al. | |

FOREIGN PATENT DOCUMENTS

| | | |
|---|---|---|
| DE | 4326150 A1 | 11/1994 |
| EP | 1156235 A2 | 11/2001 |
| JP | 3-32217 U | 3/1991 |
| JP | 7-167151 A | 7/1995 |
| JP | 11-210771 A | 8/1999 |
| JP | 2000-220710 A | 8/2000 |
| JP | 2004-270886 A | 9/2004 |
| JP | 2006-132703 A | 5/2006 |
| JP | 2007-064287 A | 3/2007 |
| JP | 2007-113725 A | 5/2007 |

OTHER PUBLICATIONS

German Office Action issued Jul. 7, 2011 for German Application No. 11 2008 002 352.2.

* cited by examiner

*Primary Examiner* — Thomas R Hannon
(74) *Attorney, Agent, or Firm* — Sughrue Mion, PLLC

(57) ABSTRACT

A bearing structure includes a radial bearing for rotatably supporting an end of a rotary shaft while the rotary shaft receives a thrust load. The rotary shaft has an outer periphery. The bearing structure is characterized by comprising a rolling body supported in the radial direction of the rotary shaft within the bearing, a support portion for rotatably supporting the rolling body, an extended portion extending from the support portion toward the axial direction of the rotary shaft. The support portion is fit over an outer periphery of the rotary shaft. The extended portion is press-fitted over the outer periphery of the rotary shaft.

5 Claims, 2 Drawing Sheets

BEARING STRUCTURE

CROSS REFERENCE TO RELATED APPLICATION

This application is a National Stage of International Application No. PCT/JP2008/068118 filed Sep. 29, 2008, claiming priority based on Japanese Patent Application No. 2007-266695, filed Oct. 12, 2007, the contents of all of which are incorporated herein by reference in their entirety.

FIELD OF THE INVENTION

The present invention relates to a bearing structure including a radial bearing for rotatably supporting an end of a rotary shaft while the radial bearing receives a thrust load.

BACKGROUND OF THE INVENTION

As one of automatic transmissions, a continuously variable transmission is known. This mechanism includes an input shaft sheave and an output shaft sheave. The input shaft sheave is provided on the input shaft to which the power from an internal combustion engine is input. The output shaft sheave is provided on the output shaft that outputs the power input to the input shaft to the drive wheel. Each sheave includes a movable sheave element and a fixed sheave element. The movable sheave element has a piston and the location of the piston may be varied along the axial direction by hydraulic pressure occurred in a hydraulic pressure chamber. The fixed sheave element is coupled to the input shaft or the output shaft in such a manner that the location of the fixed sheave element along the axial direction thereof is fixed. A groove having a generally V-shaped cross section is formed between the two sheave elements and a V-belt is wound around the input and the output shaft sheaves in the grooves. In such a continuously variable transmission, the width of the grooves in which the V-belt is wound around, or the sheave width, are continuously changed. Accordingly, the stepless change in the transmission gear ratio is achieved.

Generally, a bearing is used to reduce the friction between a rotary shaft which the bearing supports and attachment portion of the rotary shaft. A radial bearing is a bearing that deals with a radial load which acts in a direction perpendicular to the rotary shaft. Each of the input shaft and the output shaft of the above-described continuously variable transmission is rotatably supported at one end by the radial bearing that is fit over the shaft connected to the movable sheave element and the fixed sheave element.

When the radial bearing supports the rotary shaft, it is possible that the bearing drops off from the rotary shaft by the action of the thrust load generated from hydraulic pressure in the hydraulic pressure chamber. To suppress this, for example, Japanese Laid-open Patent Publication 2000-220710 discloses a nut that is threaded on the end of the rotary shaft. More specifically, referring to FIG. 1A, a radial bearing 33 includes an inner race 33a, an outer race 33b, and a ball 33c between them. The inner race 33a is fit over one end of a shaft 32 that is connected to a fixed sheave element. A threaded portion 32d is formed on the shaft 32 at a position closer toward the end than the position where the inner race 33a is press-fitted. A threaded portion 34d of the nut 34 mates with the threaded portion 32d of the shaft 32.

Japanese Laid-open Patent Publication 2006-132703 discloses a bearing structure in which a nut for fixing a bearing is omitted, as illustrated in FIG. 1B. As illustrated, threaded portion 43d is formed on the inner periphery of an inner race 43a of a radial bearing 43 and a threaded portion 42d is formed on the outer periphery of a shaft 42 connected to a fixed sheave element. The threaded portions 43d and 42d mates together.

In the above bearing structures of JP-A-2000-220710 and JP-A-2006-132703, the cross-sectional shape of the threaded grooves of the threaded portions 32d and 42d is a notch. For this reason, stress concentration generates at the bottom of the threaded groove. Generation of the stress concentration may causes cracks at the bottom thereby deteriorating fatigue strength of the shafts 32 and 42.

This problem is not limited to a bearing structure of the continuously variable transmission but common to bearing structures including a radial bearing for rotatably supporting an end of the rotary shaft while the radial bearing receives a thrust load.

SUMMARY OF THE INVENTION

Accordingly, it is an object of the invention to provide a bearing structure that suppress drop off of a bearing from a rotary shaft and that improves fatigue strength of the rotary shaft.

In one aspect, a bearing structure including a radial bearing for rotatably supporting an end of a rotary shaft while the radial bearing receives a thrust load is provided. The rotary shaft has an outer periphery. The bearing structure includes is characterized by comprising a rolling body supported in the radial direction of the rotary shaft within the bearing, a support portion for rotatably supporting the rolling body, and an extended portion extending from the support portion toward the axial direction of the rotary shaft. The support portion is fit over an outer periphery of the rotary shaft whereas the extended portion is press-fitted over the outer periphery of the rotary shaft.

In another aspect a bearing structure including a radial bearing for rotatably supporting an end of a rotary shaft adjacent to a piston mechanism of a continuously variable transmission is provided. The rotary shaft has an outer periphery. The continuously variable transmission includes the rotary shaft, a fixed sheave element fixed to the rotary shaft, a movable sheave element moving along the rotary shaft, the piston mechanism for driving the movable sheave element, and a belt wound around the fixed sheave element and the movable sheave element. The bearing structure is characterized by comprising a rolling body supported in the radial direction of the rotary shaft within the bearing, a support portion for rotatably supporting the rolling body, and an extended portion extending from the support portion toward the axial direction of the rotary shaft. The support portion is fitted over an outer periphery of the rotary shaft whereas the extended portion is press-fitted over the outer periphery of the rotary shaft.

In one embodiment, the support portion may be press-fitted over the outer periphery of the rotary shaft and a press fitting allowance at the extended portion may be greater than press fitting allowance at the support portion.

In another embodiment, the bearing structure may further comprise a non-press-fitted portion that is not press-fitted over the outer periphery of the rotary shaft between the support portion and the extended portion.

In yet another embodiment, the extended portion may extend from the support portion toward the end of the rotary shaft.

In still another embodiment, the inside diameter of the extended portion may be smaller than the inside diameter of the support portion and the outside diameter of the portion of the rotary shaft at which the extended portion may is press-fitted over may be smaller than the outside diameter of the portion of the rotary shaft at which the support portion is fitted.

Other aspects and advantages of the invention will become apparent from the following description, taken in conjunction with the accompanying drawings, illustrating by way of example the principles of the invention.

BRIEF DESCRIPTION OF DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A bearing structure according to a preferred embodiment of the invention will be described with reference to FIGS. 2 and 3.

Figure 1A:
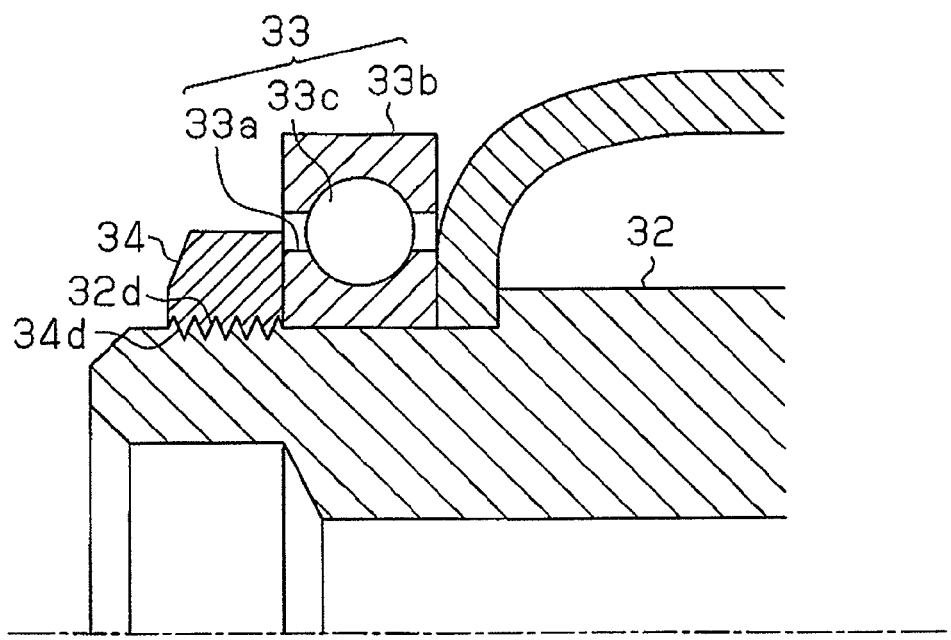
FIG. 1A is a cross-sectional view illustrating a part of a bearing structure of a conventional continuously variable transmission.
Figure 1B:
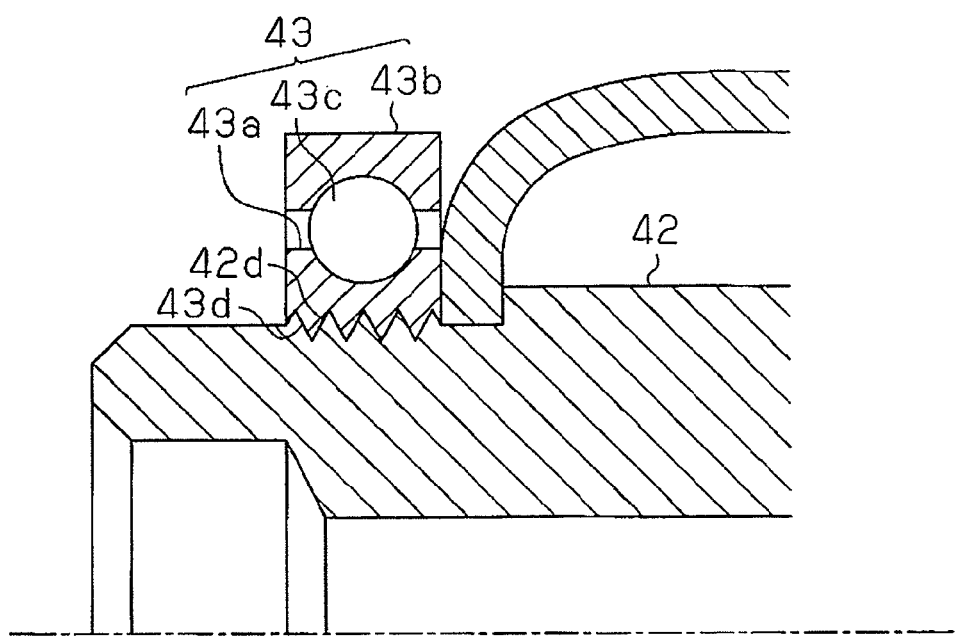
FIG. 1B is a cross-sectional view illustrating a part of a bearing structure of another conventional continuously variable transmission.
Figure 2:
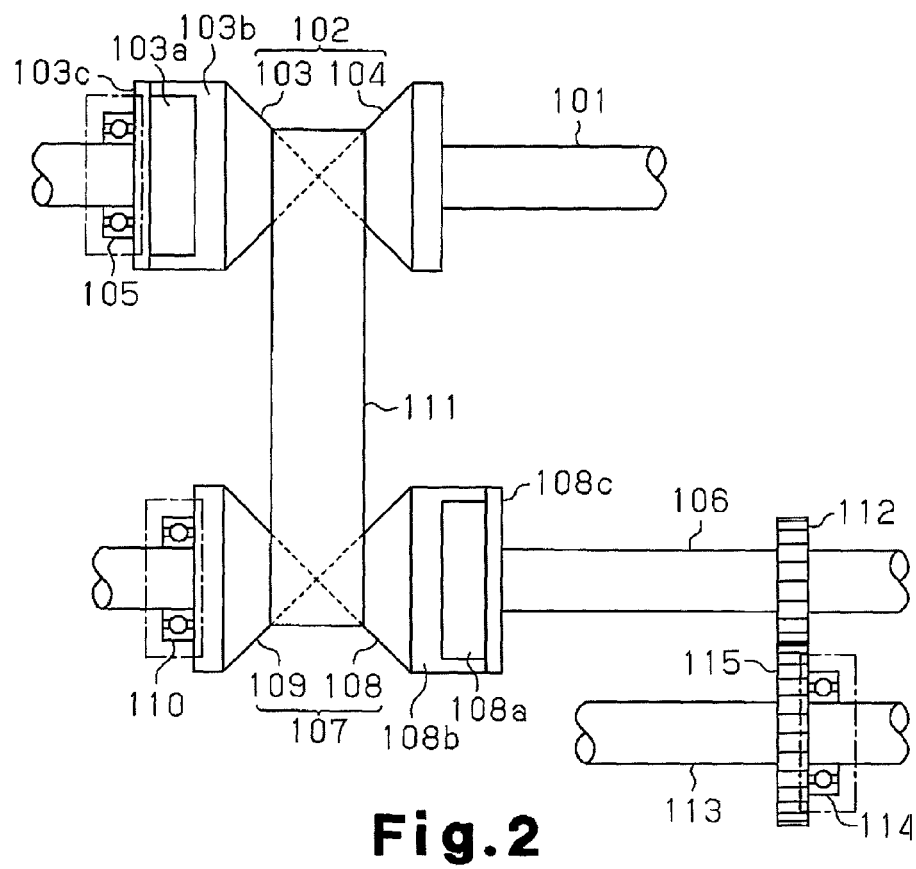
FIG. 2 is a configuration of a continuously variable transmission according to a preferred embodiment of the invention.
Figure 3:
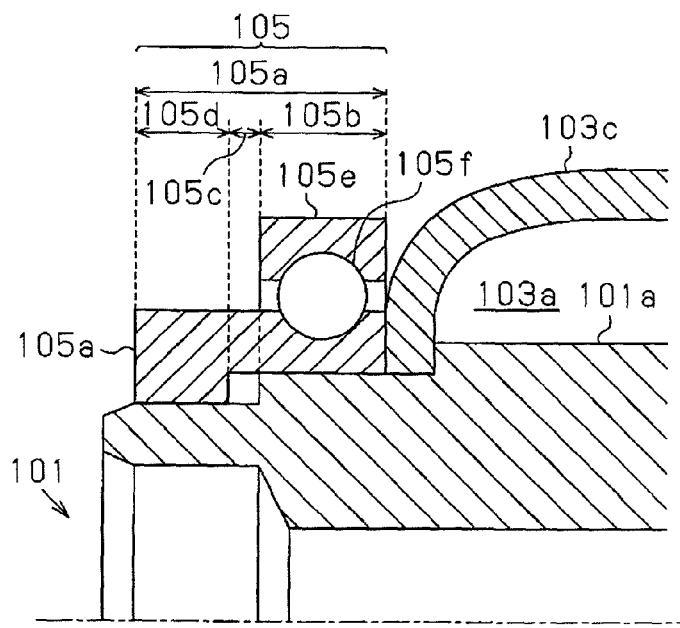
FIG. 3 is a cross-sectional view illustrating a part of a bearing structure of the transmission of FIG. 2.

FIG. 2 schematically illustrates V-belt type continuously variable transmission in which a bearing structure according to a preferred embodiment of the invention is used. The input shaft 101 receives the power from an internal combustion engine (not shown) and the output shaft 106 outputs the power to the drive wheel of a vehicle. An input shaft sheave 102 and an output shaft sheave 107 are provided on the input shaft 101 and the output shaft 106, respectively. The sheaves 102 and 107 include movable sheave elements 103 and 108, respectively. Each of the movable sheave elements 103 and 108 is provided with a piston mechanism including a housing 103c or 108c, a piston 103b or 108b that is movable along the axial direction of the input shaft 101 or the output shaft 106, and a hydraulic pressure chamber 103a or 108a that generates the power to move the piston 103b or 108b. The sheaves 102 and 107 also include fixed sheave elements 104 and 109 that cannot move in the axial direction of the input shaft 101. Grooves having Generally V-shaped cross sections are formed between the movable sheave element 103 and the fixed sheave element 104 and between the movable sheave element 108 and the fixed sheave element 109. A V-belt 111 is wound around the input shaft sheave 102 and in the output shaft sheave 107 in their grooves.

By changing the hydraulic pressure in the hydraulic pressure chambers 103a, 108a of the movable sheave elements 103, 108, the position of the pistons 103b, 108b in the axial direction of the input shaft 101 is changed. Then, the width of the grooves between the movable sheave element 103 and the fixed sheave element 104 and that between the movable sheave element 108 and the fixed sheave element 109 are changed. Since this change in width of the grooves is continuous, the width of the grooves in the sheaves 102 and 107 in which the V-belt is wound around, or the sheave width, are continuously changed. Accordingly, the stepless change in the transmission gear ratio is achieved.

A reduction drive gear 112 on output shaft 106 mates with a reduction driven gear 115 on the counter shaft 113. The power transmitted from the input shaft 101 to the output shaft 106 via the V-belt 111 is ultimately transmitted to a drive gear (not shown) of the vehicle through the reduction drive gear 112 on the output shaft 106 and the reduction driven gear 115 on the counter shaft 113.

Each of the input shaft 101, the output shaft 106, and the counter shaft 113, which are rotary shafts constituting a continuously variable transmission, is supported at one end by the respective one of bearing structures 105, 110 and 114 each of which includes a radial bearing that deals with a radial load which acts in a direction perpendicular to the rotary shaft 101, 106 or 113.

As described above, when the radial bearing supports the rotary shaft while it receives a thrust load in addition to the radial load, it is possible that the bearing drops off from the rotary shaft due to the thrust load. To address this, retaining strength that is sufficient to resist the thrust load is required in the structure of the bearing and the structure for retaining the bearing on the rotary shaft (i.e., bearing structure).

However, if the nut is used to improve the retaining strength, stress concentration is caused at the threaded portion provided on the outer periphery of the rotary shaft due to threading, thereby deteriorating fatigue strength of the rotary shaft.

Thus, according to the bearing structure of the present embodiment, instead of providing the threaded portion with a notch, an extended portion is provided to suppress the drop off of the bearing from the rotary shaft. The extended portion extends from the support portion for supporting a rolling body of the bearing in the axial direction of the rotary shaft and fit over the outer periphery of the rotary shaft. For example, the bearing structure of the present embodiment is used in the bearing structure 105 because the bearing structure 105 includes a radial bearing for supporting an end of the input shaft 101 of the continuously variable transmission and thrust load, which is generated from hydraulic pressure occurred in the hydraulic pressure chamber 103a of the movable sheave element 103, is applied to bearing structure 105.

The bearing structure of the input shaft will be described with reference to FIG. 3. FIG. 3 is an enlarged detailed view of the portion in the input shaft 101 encircled by the alternated long and short dashed line in FIG. 2.

The input shaft 101 is rotatably supported at one end by the bearing structure 105 including a radial bearing that is press-fitted over the shaft body 101a connected to the fixed sheave element 104. The bearing structure 105 abuts the housing 103c of the movable sheave element 103. The hydraulic pressure chamber 103a of the piston mechanism is formed within the housing 103c. That is, the bearing structure 105 rotatably supports the end of the input shaft 101 adjacent to the piston mechanism.

Specifically, the inner race 105a of the bearing structure 105 is press-fitted over the outer periphery of the shaft body 101a. The inner race 105a includes a support portion 105b that supports a ball or rolling body 105f in cooperation with the outer race 105e of the bearing structure 105, an extended portion 105d that extends from the support portion 105b in the axial direction of the input shaft 101, and the non-press-fitted portion 105c between them. The extended portion 105d extends from the support portion 105b toward the end of the input shaft 101.

When these portions are compared, inside diameter of the support portion 105b and that of the non-press-fitted portion 105c are equal but the inside diameter of the extended portion 105d is smaller than that. Moreover, at the portion of the shaft body 101a at which the inner race 105a is press-fitted, the portion of the shaft body 101a at which the non-press-fitted portion 105c extends and the portion of the shaft body 101a at which the extended portion 105d is press-fitted have the equal outside diameters but the outside diameter of the portion of the shaft body 101a at which the support portion 105b is press-fitted is greater than that. The above difference in the inside diameters at the inner race 105a is greater than the difference in the outside diameters at the shaft body 101a. Thus, when the inner race 105a is press-fitted over the shaft body 101a, a press fitting allowance or margin will be greater in the extended portion 105d than in the support portion 105b and thus the non-press-fitted portion 105c between the support portion 105b and the extended portion 105d is just inserted over the shaft body 101a and not press-fitted.

The above embodiment has the following advantages.

In the above embodiment, the inner race 105a of the bearing structure 105 having the radial bearing includes the extended portion 105d that extends from the support portion 105b in the axial direction of the input shaft 101 and press-fitted over the outer periphery of the shaft body 101a (or the input shaft 101). Thus, force against the thrust load may be generated at the extended portion 105d without providing a nut for retaining the inner race 105a on the shaft 101. Since it is not necessary to provide a notched threaded portion on the outer periphery of the shaft body 101a, which may cause stress concentration, fatigue strength of the input shaft 101 may be improved.

In addition, in the configuration in which a support portion for a rolling body is press-fitted over the outer periphery of the rotary shaft, friction exerted on the rolling body becomes great due to deformation of the support portion. Thus, a press fitting allowance cannot be great to generate force against the thrust load. In comparison with this configuration, in the above embodiment, the extended portion that extends from the support portion for the rolling body is press-fitted over the outer periphery of the rotary shaft. Thus, even if the press fitting allowance at the extended portion is made greater, the deformation of the support portion is suppressed and force against the thrust load may be generated. Consequently, the drop off of the bearing from the rotary shaft is suppressed and fatigue strength of the rotary shaft is improved.

By setting the press fitting allowance at the extended portion 105d greater than that of the support portion 105b, the press-fitting at the extended portion 105d may be made tighter that the fitting at the support portion 105b. This suppresses the drop off of the inner race 105a from the input shaft 101 more easily. Even if the press fitting allowance at the extended portion 105d is made greater, the deformation at the support portion 105b will be smaller compared with the case where the press fitting allowance at the support portion 105b is made greater. In addition, this configuration enhances the force against the thrust load generated at the extended portion 105d and the force generated at the support portion 105b is added to the resisting force. Thus, the axial length of extended portion 105d required to obtain the retaining strength which is sufficient to resist the thrust load the may be shortened.

The non-press-fitted portion 105c, which is not press-fitted over the outer periphery of the shaft body 101a, is provided between the support portion 105b and the extended portion 105d. Thus configuration minimizes the effect of the distortion at the extended portion 105d, which has a great press fitting allowance, on the support portion 105b. Thus, good maintenance performance of the bearing structure 105 is achieved.

The extended portion 105d extends from the support portion 105b toward the end of the input shaft 101. Thus, for example, the extended portion 105d may be positioned at the position where the nut for resisting the thrust load was threaded conventionally. Thus, the size of the present embodiment is not enlarged compared to the example of prior art where the nut is used.

The inside diameter of the extended portion 105d that extends toward the end of the input shaft 101 is smaller than that of the support portion 105b and the outside diameter of the portion of the shaft body 101a at which the extended portion 105d is press-fitted is smaller than that of the portion of the shaft body 101a at which the support portion 105b is press-fitted. This configuration allows the press-fitting of the support portion 105b over the outer periphery of the shaft body 101a with ease. Moreover, this configuration facilitates the assemble of the support portion 105b and the extended portion 105d with respect to the shaft body 101a in the correct order.

The above embodiment may be modified as follows.

Instead of making the inside diameter of the extended portion 105d smaller than that of the support portion 105b, ⊘ inside diameter and making the press fitting allowance at the extended portion 105d greater than that in the support portion 105b, the inside diameter of the inner race 105a may be kept constant and the outside diameter of the portion of the shaft body 101a at which the extended portion is press-fitted over may be greater than that of the portion of the shaft body 101a at which the support portion is fitted. Alternatively, the outside diameter may be kept constant and the inside diameter of the extended portion 105d may be smaller than that of the support portion 105b. These alternative embodiments may also enables the press fitting allowance at the extended portion 105d to be greater than that in the support portion 105b.

The position of extended portion 105d is not limited to the position from the support portion 105b toward the end of the input shaft 101. The extended portion 105d may extend from the support portion 105b toward the movable sheave element 103. Even this configuration may provide increased retaining strength of the inner race 105a.

The non-press-fitted portion 105c may be omitted.

The press fitting allowance at the extended portion 105d may be equal to that in the support portion 105b.

In stead of press-fitting the support portion 105b of the inner race 105a over the outer periphery of the shaft body 101a, the support portion 105b may be just inserted or fitted over the shaft body 101a with a gap, so long as the press-fitting of the extended portion 105d only is sufficient enough to resist the thrust load. This configuration minimizes the deformation due to the press-fitting at the support portion 105b.

The bearing structure of the above embodiment is applicable to not only the bearing structure for the input shaft 101 of the continuously variable transmission but also the bearing structure 110 including a radial bearing for supporting the output shaft 106 and the bearing structure 114 including a radial bearing for supporting the counter shaft 113. These structures correspond to the portions in the output shaft 106 and in the counter shaft 113 encircled by the alternated long and short dashed lines in FIG. 2.

The bearing structure of the above embodiment is applicable to not only the bearing structure for the continuously variable transmission but also the bearing structure including a radial bearing for rotatably supporting an end of the rotary shaft while the radial bearing receives a thrust load.

The invention claimed is:

1. A bearing structure including a radial bearing and a rotary shaft, and wherein the radial bearing rotatably supports an end of the rotary shaft while the radial bearing receives a thrust load, rotary shaft having an outer periphery, the bearing structure comprising:
   a rolling body supported in the radial direction of the rotary shaft within the bearing;
   a support portion for rotatably supporting the rolling body, wherein the support portion is fit over an outer periphery of the rotary shaft; and
   an extended portion extending integrally from the support portion toward the axial direction of the rotary shaft, wherein the extended portion is press-fitted over the outer periphery of the rotary shaft, wherein the extended portion extends integrally from the support portion toward the end of the rotary shaft,
   wherein the inside diameter of the extended portion is smaller than the inside diameter of the support portion, and the outside diameter of the portion of the rotary shaft at which the extended portion is press-fitted over is smaller than the outside diameter of the portion of the rotary shaft at which the support portion is fitted.

2. A bearing structure including a radial bearing and a rotary shaft, and wherein the radial bearing rotatably supports an end of the rotary shaft adjacent to a piston mechanism of a continuously variable transmission, wherein the rotary shaft having an outer periphery, wherein the continuously variable transmission includes the rotary shaft, a fixed sheave element fixed to the rotary shaft, a movable sheave element moving along the rotary shaft, the piston mechanism for driving the movable sheave element, and a belt wound around the fixed sheave element and the movable sheave element, the bearing structure comprising:
   a rolling body supported in the radial direction of the rotary shaft within the bearing;
   a support portion for rotatably supporting the rolling body, wherein the support portion is fitted over an outer periphery of the rotary shaft; and
   an extended portion extending integrally from the support portion toward the axial direction of the rotary shaft, wherein the extended portion is press-fitted over the outer periphery of the rotary shaft, wherein the extended portion extends integrally from the support portion toward the end of the rotary shaft,
   wherein the inside diameter of the extended portion is smaller than the inside diameter of the support portion, and the outside diameter of the portion of the rotary shaft at which the extended portion is press-fitted over is smaller than the outside diameter of the portion of the rotary shaft at which the support portion is fitted.

3. The bearing structure of claim 1, wherein the support portion is press-fitted over the outer periphery of the rotary shaft and a press fitting allowance at the extended portion is greater than press fitting allowance at the support portion.

4. The bearing structure of claim 1, further comprising a non-press-fitted portion that is not press-fitted over the outer periphery of the rotary shaft between the support portion and the extended portion.

5. The bearing structure of claim 3, wherein the inside diameter of the support portion is equal to the inside diameter of the non-press-fitted portion and the outside diameter of the portion of the rotary shaft at which the non-press-fitted portion extends is equal to the outside diameter of the portion of the rotary shaft at which the extended portion is press-fitted.

* * * * *